United States Patent

Forssberg et al.

Patent Number: 5,181,729
Date of Patent: Jan. 26, 1993

[54] SEAL DEVICE

[75] Inventors: Alf Forssberg, Nykvan; Boris Fredriksson, Huddinge, both of Sweden

[73] Assignee: ITT Flygt AB, Solna, Sweden

[21] Appl. No.: 749,796

[22] Filed: Aug. 26, 1991

[30] Foreign Application Priority Data

Sep. 3, 1990 [SE] Sweden .................. 9002791

[51] Int. Cl.⁵ ............................. F16J 15/34
[52] U.S. Cl. ........................... 277/62; 277/86;
277/93 R; 277/93 SD; 277/65; 277/41; 277/15; 277/74
[58] Field of Search ............. 277/61, 62, 86, 93 R, 277/93 SD, 65, 41, 40, 86, 38, 39, 15, 74

[56] References Cited

U.S. PATENT DOCUMENTS

| | | | |
|---|---|---|---|
| 2,140,304 | 12/1938 | Wishart | 277/41 |
| 2,853,020 | 9/1958 | Hollinger et al. | 277/62 |
| 2,950,931 | 8/1960 | Englesson | 277/32 |
| 3,301,191 | 1/1967 | Warren | 277/62 |
| 3,361,431 | 1/1968 | Liss et al. | 277/62 |
| 3,667,766 | 6/1972 | Sussmeyer | 277/62 X |
| 4,842,494 | 6/1989 | Speiser | 277/65 X |

FOREIGN PATENT DOCUMENTS

| | | | |
|---|---|---|---|
| 0016170 | of 1928 | Australia | 277/61 |
| 530876 | 8/1954 | Belgium | 277/61 |
| 0047056 | 4/1980 | Japan | 277/65 |

Primary Examiner—Thomas B. Will
Assistant Examiner—James K. Folker
Attorney, Agent, or Firm—Menotti J. Lombardi

[57] ABSTRACT

Two identical mechanical seals (6, 7) and (8, 9) respectively and an intermediate spring device (17) are arranged in a holder which is easily replaceable. The spring (17) is common for the two seals and is connected to sockets (13) and (14) respectively which anchor the rotating seal rings (6) and (8) respectively. The oil containment area (20) of the machine is connected to the area containing the spring (17).

4 Claims, 2 Drawing Sheets

SEAL DEVICE

BACKGROUND OF THE INVENTION

The invention concerns a seal device for a submersible machine such as a pump or a mixer.

A machine of this type normally comprises an electrically driven motor and a hydraulic unit with an impeller connected to the motor via a rotary shaft.

In order to prevent the medium within the hydraulic unit from entering the motor along the shaft, one or several seals are arranged between the hydraulic unit and the motor. A common type of seal is the so-called mechanical seal which comprises a seal ring rotating with the shaft and a stationary ring attached to the surrounding housing. The two seal rings are pressed against each other by spring force preventing medium from entering between the seal faces.

If the medium within the hydraulic unit contains pollutions those may, as the pressure is higher in the hydraulic unit, enter between the seal faces and damage them causing a bad seal result.

It is thus common to arrange two mechanical seals parted by a room filled with oil which lubricates and cools the seal faces. In this way the seal adjacent the motor will always operate with a clean medium thus diminishing the risks for damages. If the seal adjacent the hydraulic unit should be damaged, medium may enter the oil housing, but by controlling the oil at certain intervals the damaged seal may be replaced before the oil has been too diluted. An example of such a solution is shown in the Swedish Patent No. 381 318.

If it has been noted that the dilution of the oil has gone beyond a certain limit, the seal adjacent the hydraulic unit must be replaced. If the dilution has gone very far, the other seal might have been damaged as well and thus it is often advisable to replace both seals at the same time.

In order to simplify replacement of the seals it has been suggested to connect the two seals into one single unit. An example of such a solution is shown in the Swedish patent No. 200 144 (U.S. Pat. No. 2,950,931). This construction shows many advantages, but because of the great number of details it is too expensive to be used extensively. In addition to that, the attachment of the seal means is carried out by the pump impeller causing axial loads which might damage the seal rings and mean bad alignment. This invention is a further development of this known device where the disadvantages have been eliminated.

SUMMARY OF THE INVENTION

An object of the invention is to provide an improved seal device to overcome disadvantages of known devices.

According to the broader aspects of the invention, a pair of identical mechanical seals and an intermediate spring device are arranged in a holder which is easy to replace. The spring is common for both seals and is connected to sockets which anchor the rotating seal rings. The oil containing area of the machine is connected to the area containing the spring device.

BRIEF DESCRIPTION OF THE DRAWINGS

Other objects and advantages of the invention will become more fully apparent from the following description, claims, and drawings in which:

DETAILED DESCRIPTION OF THE PREFERRED EMBODIMENT

Figure 1:
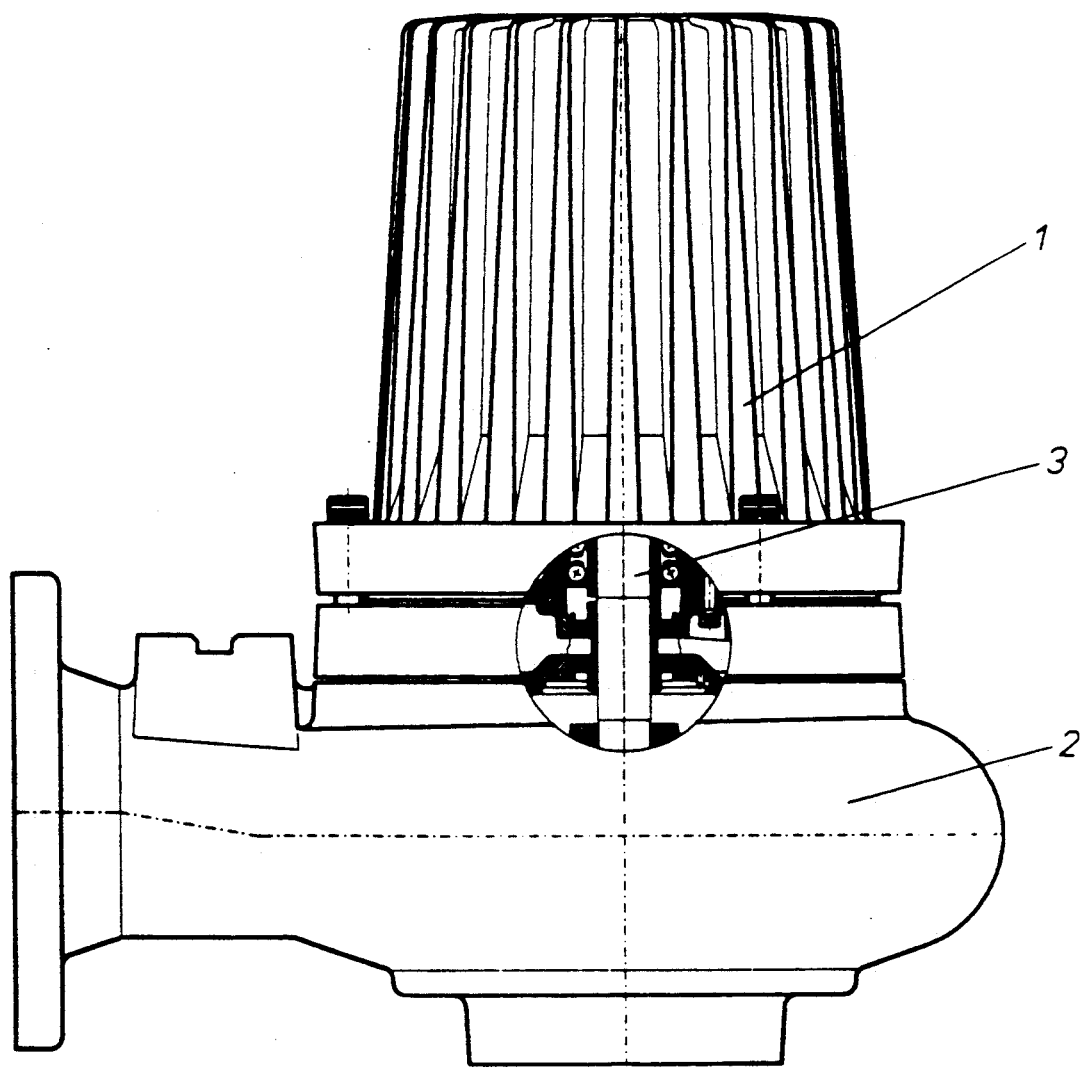
FIG. 1 shows a section view of a pump unit provided with a seal unit according to the invention.
Figure 2:
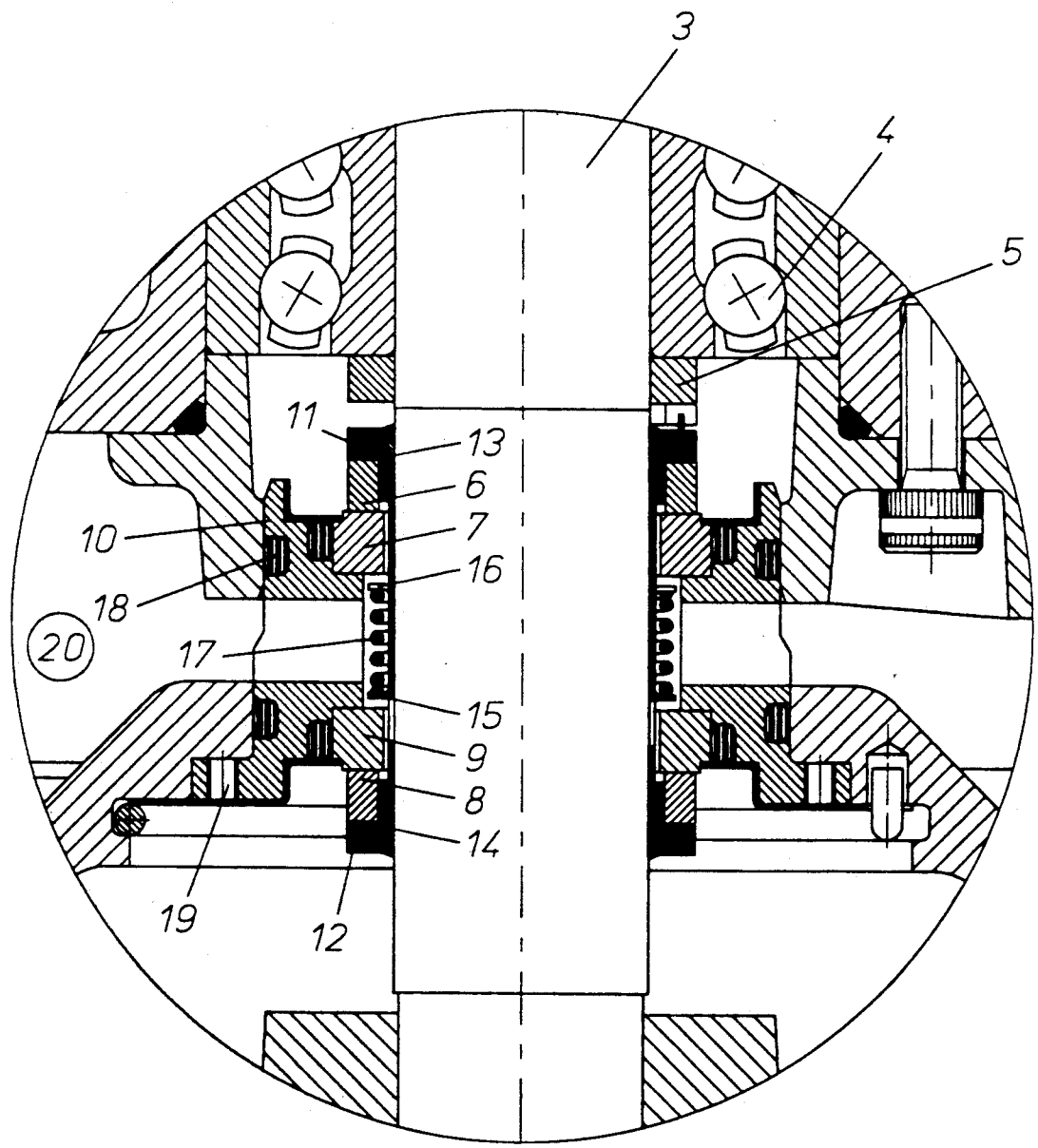
FIG. 2 shows an enlarged view of the seal.

FIG. 1 illustrates a driving unit 1, a hydraulic unit 2, and a connecting driving shaft 3. FIG. 2 illustrates a bearing 4, a locking ring 5, and seal rings 6, 7, 8 and 9. A holder 10, holding rings 11, 12, sockets 13, 14 with extensions 15 and 16 respectively, a spring 17, O-rings 18, attachment holes 19, and an oil containment area 20.

The illustrated seal device, which is placed between the driving motor 1 and the hydraulic unit 2 of the pump is meant to prevent pumped medium from entering the motor via the shaft 3. The device consists of two identical mechanical seals, respectively called the upper and the lower, having rotating rings 6 and 8 respectively and stationary rings 7 and 9 respectively. These rings are normally manufactured of hard metal or similar type ring material. The rotating rings 6 and 8 do not rotate with respect to the shaft and a attached to the shaft 3 by help of holding or retaining rings 11 and 12 which are made of flexible material. The latter are fixed against turning around the shaft in a suitable manner, for instance by means of a locking ring 5 pressed around the shaft 3. The holding rings 11 and 12 also serve to prevent fluid and pollutions from entering along the surface of the shaft.

The non-rotary rings 7 and 9 respectively are arranged in a holder 10 which constitutes the supporting part of the seal device and which can be mounted in the machine by means of screws in holes 19. A common pressure spring 17 for pressing the rings 6 and 7 and 8 and 9 respectively together, is arranged around the shaft between the two seals. This spring engages with a flange 15 on the socket 13 for the upper seal 6, 7 and with a flange 16 on the corresponding socket 14 for the lower seal 8, 9. The ends of the two sockets 13 and 14 which are heading each other are slotted, forming fingers, thus enabling them to go beyond each other. This means that the flange 15 on the socket 13 is situated near the lower seal 8, 9 while the flange 16 on the socket 14 is situated near the upper seal 6, 7. The spring 17 will then press the flange 15 downwards and the flange 16 upwards, meaning that the entire seal package is kept together by the spring which simultaneously presses the two seals 6, 7 and 8, 9 respectively together.

The area within which the seal 17 operates is connected to an oil containment area 20 in the machine enabling oil in the latter to penetrate along the shaft to the seals for lubrication and cooling of the seal faces. By means of a suitable arrangement of the openings between the oil area 20 and the area containing the spring, the transport of oil may be facilitated by the spring operating as a pump.

The seal device according to the invention has a number of advantages. As designed, it is an easily replaceable unit, the service is simplified considerably and a correct pressure between the seal rings is automatically obtained. There isn't any axial force generated by the pump impeller that might cause an improper alignment between the seal faces. This design with the common spring for the two reversed seals allows a shorter mounting dimension which makes the machine less expensive. The two identical upper and lower seals also contribute to a less expensive design, and since the spring force presses the two seals together, there is no need for any specific means to hold the package during mounting. The lower seal, which is exposed to the worst conditions, is turned so that a high pressure within the hydraulic unit increases the pressure that presses the seal rings together. The openings which allow exchange of oil between the oil area 20 and the inner area of the seal device bring about a very good cooling of the seal rings.

While the invention has been disclosed in connection with a preferred embodiment thereof, it should be understood that the scope of the invention is defined by the following claims.

What is claimed is:

1. A seal arrangement for a shaft connecting a driving unit to a hydraulic unit, the arrangement comprising in combination:
    a first seal device having a first rotating seal ring (6) and a first stationary seal ring (7), with said first stationary seal ring being retained in a holder (10) in said driving unit,
    said first seal device having a first elastic holding ring (11) for rotatably mounting said first rotating seal ring (6) on said shaft, and
    said first holding ring (11) having a first slotted socket member (13) forming fingers extending along said shaft beyond said first stationary seal ring (7) and forming at its extended end a first collar (15);
    a second seal device axially displaced from said first seal device, said second seal device having a second rotating seal ring (8) and a second stationary seal ring (9), with said second stationary seal ring being retained in said holder (10) in aid driving unit,
    said second rotating seal device having a second elastic holding ring (12) for rotatably mounting said second seal ring (8) on said shaft, and
    said second holding ring (12) having a second slotted socket member (14) forming fingers extending along said shaft in an interlaced manner with said first socket member (13) toward said first seal device and forming at its extended end a second collar (16); and
    a compression spring (17) arranged around said shaft and between said first collar (15) and second collar (16), whereby said first rotating seal ring (6), is pressed against said first stationary seal ring (7) and said second rotating seal ring (8) is pressed against said second stationary seal ring (9).

2. The combination according o claim 1 wherein aid holder (10) includes a channel area for coupling lubricating and cooling medium to said first and second seal devices.

3. The combination according to claim 1, including a locking ring (5) being pressed on said shaft and engaging a tab extending from said first socket member (13) at an end opposite said first collar (15).

4. The combination according to claim 2 wherein said first and second holding rings (11), (12) prevent said medium from entering said driving and hydraulic units along said shaft.

* * * * *